United States Patent
Kozuka et al.

(10) Patent No.: US 10,803,872 B2
(45) Date of Patent: Oct. 13, 2020

(54) INFORMATION PROCESSING APPARATUS FOR TRANSMITTING SPEECH SIGNALS SELECTIVELY TO A PLURALITY OF SPEECH RECOGNITION SERVERS, SPEECH RECOGNITION SYSTEM INCLUDING THE INFORMATION PROCESSING APPARATUS, AND INFORMATION PROCESSING METHOD

(71) Applicant: Panasonic Intellectual Property Management Co., Ltd., Osaka (JP)

(72) Inventors: Masayuki Kozuka, Osaka (JP); Tomoki Ogawa, Osaka (JP); Yoshihiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/325,844

(22) PCT Filed: Feb. 2, 2018

(86) PCT No.: PCT/JP2018/003522
§ 371 (c)(1),
(2) Date: Feb. 15, 2019

(87) PCT Pub. No.: WO2019/026314
PCT Pub. Date: Feb. 7, 2019

(65) Prior Publication Data
US 2019/0187953 A1    Jun. 20, 2019

Related U.S. Application Data

(60) Provisional application No. 62/540,415, filed on Aug. 2, 2017.

(51) Int. Cl.
*G06F 17/00* (2019.01)
*G10L 15/30* (2013.01)
(Continued)

(52) U.S. Cl.
CPC ............... *G10L 15/30* (2013.01); *G06F 3/16* (2013.01); *G06F 3/162* (2013.01); *G06F 3/167* (2013.01);
(Continued)

(58) Field of Classification Search
CPC . G10L 15/30; G06F 3/16; G06F 3/162; G06F 3/167
See application file for complete search history.

(56) References Cited

U.S. PATENT DOCUMENTS

2005/0010422 A1    1/2005  Ikeda et al.
2016/0125883 A1*   5/2016  Koya ................. G10L 15/30
                                                    704/232
(Continued)

FOREIGN PATENT DOCUMENTS

JP    2016-095383 A    5/2016
JP    2017-138476 A    8/2017

OTHER PUBLICATIONS

International Search Report issued in Application No. PCT/JP2018/003521 dated Feb. 27, 2018, with English translation.
(Continued)

*Primary Examiner* — Joseph Saunders, Jr.
(74) *Attorney, Agent, or Firm* — McDermott Will & Emery LLP

(57) ABSTRACT

An information processing apparatus includes: a speech obtainer which obtains speech of a user; a first controller which, when the first controller recognizes that the speech obtained by the speech obtainer is a first activation word, outputs a speech signal corresponding to the first activation
(Continued)

word; and a second controller. In the first speech transmission process in which the speech signal of the speech obtained by speech obtainer is transmitted to the VPA cloud server, the first controller determines whether to output a speech signal corresponding to a second activation word to the second controller based on a predetermined priority level when the first controller recognizes that the speech obtained by the speech obtainer indicates the second activation word for causing the second controller to start a second speech transmission process.

7 Claims, 15 Drawing Sheets

(51) Int. Cl.
*G06F 3/16* (2006.01)
*G10L 15/20* (2006.01)
*G10L 15/22* (2006.01)
*G10L 15/08* (2006.01)

(52) U.S. Cl.
CPC .............. *G10L 15/08* (2013.01); *G10L 15/20* (2013.01); *G10L 15/22* (2013.01); *G10L 2015/088* (2013.01); *G10L 2015/223* (2013.01)

(56) References Cited

U.S. PATENT DOCUMENTS

| 2016/0293168 | A1 | 10/2016 | Chen |
| 2017/0269975 | A1* | 9/2017 | Wood ...................... G06F 3/167 |
| 2018/0061418 | A1* | 3/2018 | Patil ...................... G06F 3/0482 |
| 2018/0101533 | A1* | 4/2018 | Robichaud ........ G06F 16/24578 |
| 2018/0301147 | A1* | 10/2018 | Kim ........................ G10L 15/22 |
| 2019/0019513 | A1 | 1/2019 | Kirihara |

OTHER PUBLICATIONS

International Search Report issued in Application No. PCT/JP2018/003522 dated Mar. 6, 2018, with English translation.
Extended European Search Report issued in corresponding European Patent Application No. 18842220.8, dated Jun. 19, 2020.

* cited by examiner

FIG. 3

| | ACTIVATION WORD | | FUNCTION ACTIVATION WORD | COMMAND DETAILS |
|---|---|---|---|---|
| | DEFAULT | USER SELECTION | | |
| VPA PROVISION SERVICE | WORDS SPECIFIED BY VPA SERVICE PROVIDER | SELECT WORD FROM WORDS SPECIFIED BY VPA SERVICE PROVIDER | WEATHER FORECAST | TODAY |
| | | | AUDIO STREAMING SERVICE NAME | 80'S TUNE |
| HOUSEHOLD ELECTRICAL APPLIANCE CONTROL SERVICE | | | COMPANY A | TURN ON AIR CONDITIONERS |
| | | | TELEVISION RECEIVER | INCREASE SOUND VOLUME |

FIG. 7

|  | ACTIVATION WORD | | FUNCTION ACTIVATION WORD | COMMAND DETAILS |
|---|---|---|---|---|
|  | DEFAULT | USER SELECTION | | |
| VPA PROVISION SERVICE | WORDS SPECIFIED BY VPA SERVICE PROVIDER | SELECT WORD FROM WORDS SPECIFIED BY VPA SERVICE PROVIDER OR WORDS SPECIFIED BY USER (NAMES OF PETS, ETC.) | WEATHER FORECAST | TODAY |
|  | | | AUDIO STREAMING SERVICE NAME | 80'S TUNE |
| HOUSEHOLD ELECTRICAL APPLIANCE CONTROL SERVICE | WORDS SPECIFIED BY COMPANY A ("COMPANY A", ETC.) | | COMPANY A | TURN ON AIR CONDITIONERS |
|  | | | TELEVISION RECEIVER | INCREASE SOUND VOLUME |

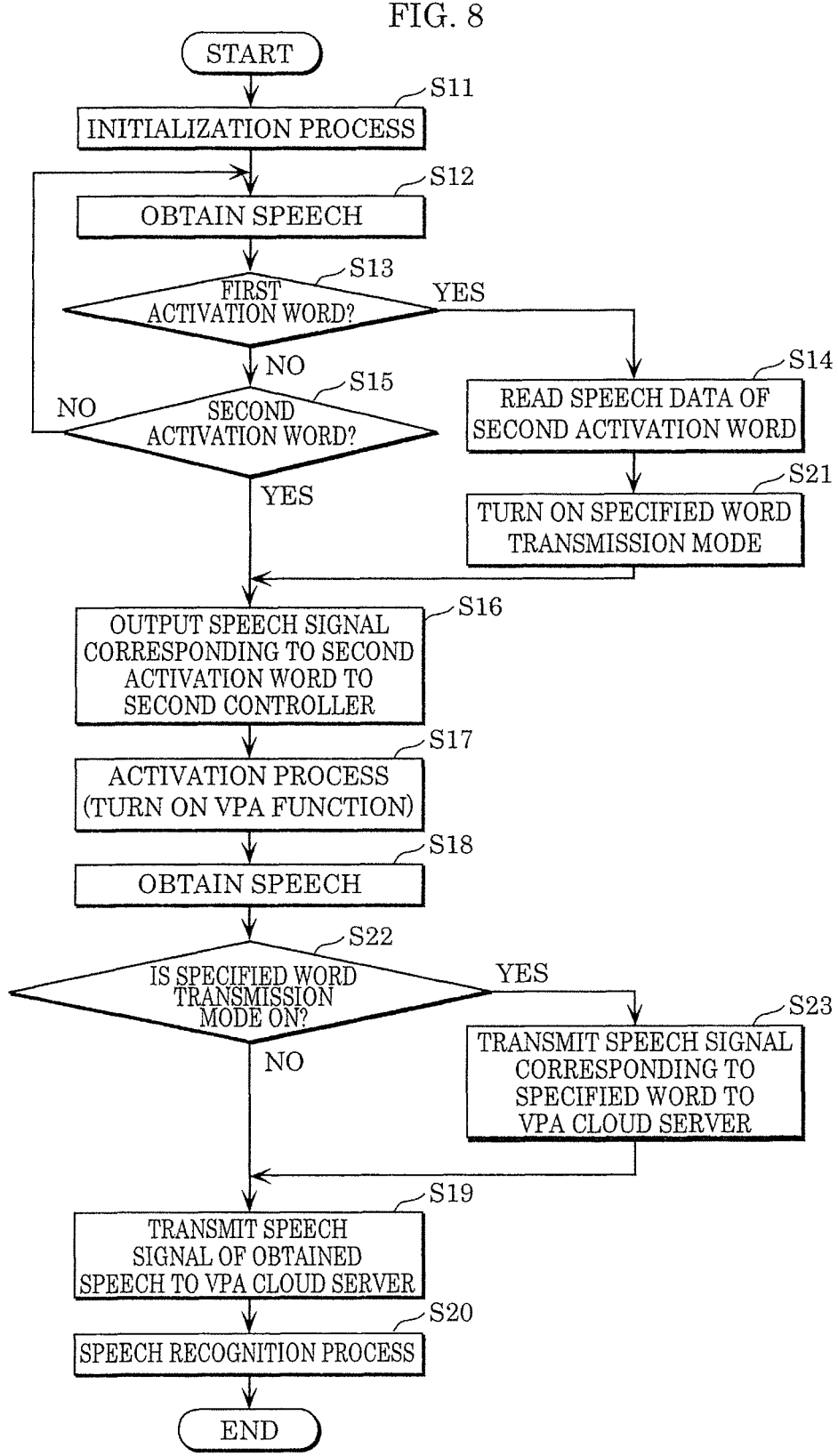

FIG. 9

| | ACTIVATION WORD | | FUNCTION ACTIVATION WORD | COMMAND DETAILS |
|---|---|---|---|---|
| | DEFAULT | USER SELECTION | | |
| VPA PROVISION SERVICE | WORDS SPECIFIED BY VPA SERVICE PROVIDER | SELECT WORD FROM WORDS SPECIFIED BY VPA SERVICE PROVIDER OR WORDS SPECIFIED BY USER (NAMES OF PETS, ETC.) | WEATHER FORECAST | TODAY |
| | | | AUDIO STREAMING SERVICE NAME | 80'S TUNE |
| HOUSEHOLD ELECTRICAL APPLIANCE CONTROL SERVICE | WORDS SPECIFIED BY COMPANY A ("COMPANY A", ETC.) | | (OMITTED) | TURN ON AIR CONDITIONERS |
| | | | TELEVISION RECEIVER | INCREASE SOUND VOLUME |

US 10,803,872 B2

INFORMATION PROCESSING APPARATUS FOR TRANSMITTING SPEECH SIGNALS SELECTIVELY TO A PLURALITY OF SPEECH RECOGNITION SERVERS, SPEECH RECOGNITION SYSTEM INCLUDING THE INFORMATION PROCESSING APPARATUS, AND INFORMATION PROCESSING METHOD

RELATED APPLICATIONS

This application is the U.S. National Phase under 35 U.S.C. § 371 of International Application No. PCT/JP2018/003522, filed on Feb. 2, 2018, which in turn claims the benefit of U.S. Provisional Application No. 62/540,415, filed Aug. 2, 2017, the disclosures of which are incorporated by reference herein.

TECHNICAL FIELD

The present disclosure relates to an information processing apparatus for use in a speech recognition system.

BACKGROUND ART

What is called virtual personal assistance (VPA) services for operating devices by speech have started to spread. Patent Literature 1 discloses an information processing apparatus which predicts utterance of a user when the apparatus detected an activation word.

CITATION LIST

Patent Literature

PTL 1: Japanese Unexamined Patent Application Publication No. 2017-138476

SUMMARY OF THE INVENTION

Technical Problem

When main speech recognition is performed in a cloud server, for example, an information processing apparatus starts transmission of a speech signal to a speech recognition server by recognizing an activation word.

The present disclosure provides an information processing apparatus capable of transmitting speech signals selectively to a plurality of speech recognition servers.

Solution to Problem

An information processing apparatus according to an aspect of the present disclosure includes: a speech obtainer which obtains speech of a user; a first controller which, when the first controller recognizes that the speech obtained by the speech obtainer is a first activation word, outputs a speech signal corresponding to the first activation word; and a second controller which starts a first speech transmission process of transmitting the speech signal of the speech obtained by the speech obtainer to a first speech recognition server when the second controller recognizes that the speech signal output by the first controller indicates the first activation word, wherein the first controller determines whether to output a speech signal corresponding to a second activation word to the second controller based on a predetermined priority level when the first controller recognizes in the first speech transmission process that the speech obtained by the speech obtainer is the second activation word for causing the second controller to start a second speech transmission process, and the second speech transmission process is a process for transmitting the speech signal of the speech obtained by the speech obtainer to a second speech recognition server different from the first speech recognition server.

For example, these general and specific aspects of the present disclosure may be implemented using, a system, a method, an integrated circuit, a computer program, or a computer-readable recording medium such as a CD-ROM, or any combination of, systems, methods, integrated circuits, computer programs, or computer-readable recording media.

Advantageous Effect of Invention

The information processing apparatus according to the present disclosure is capable of transmitting speech signals selectively to a plurality of speech recognition servers.

BRIEF DESCRIPTION OF DRAWINGS

FIG. 3 is a diagram indicating the relationship between services and activation words.

FIG. 7 is a diagram indicating the relationship between services and activation words according to Embodiment 1.

FIG. 8 is a flowchart indicating operations performed by the speech recognition system according to Embodiment 2.

FIG. 9 is a diagram indicating the relationship between services and activation words according to Embodiment 2.

DESCRIPTION OF EXEMPLARY EMBODIMENTS (Underlying Knowledge Forming Basis of the Present Disclosure)

What is called virtual personal assistance (VPA) services for operating devices by speech have started to spread. Such services include: Alexa (registered trademark) provided by Amazon (registered trademark) in the U.S.; Google Assistant (registered trademark) provided by Google (registered trademark) in the U.S.; and Cortana (registered trademark) provided by Microsoft (registered trademark) in the U.S.

Figure 1:
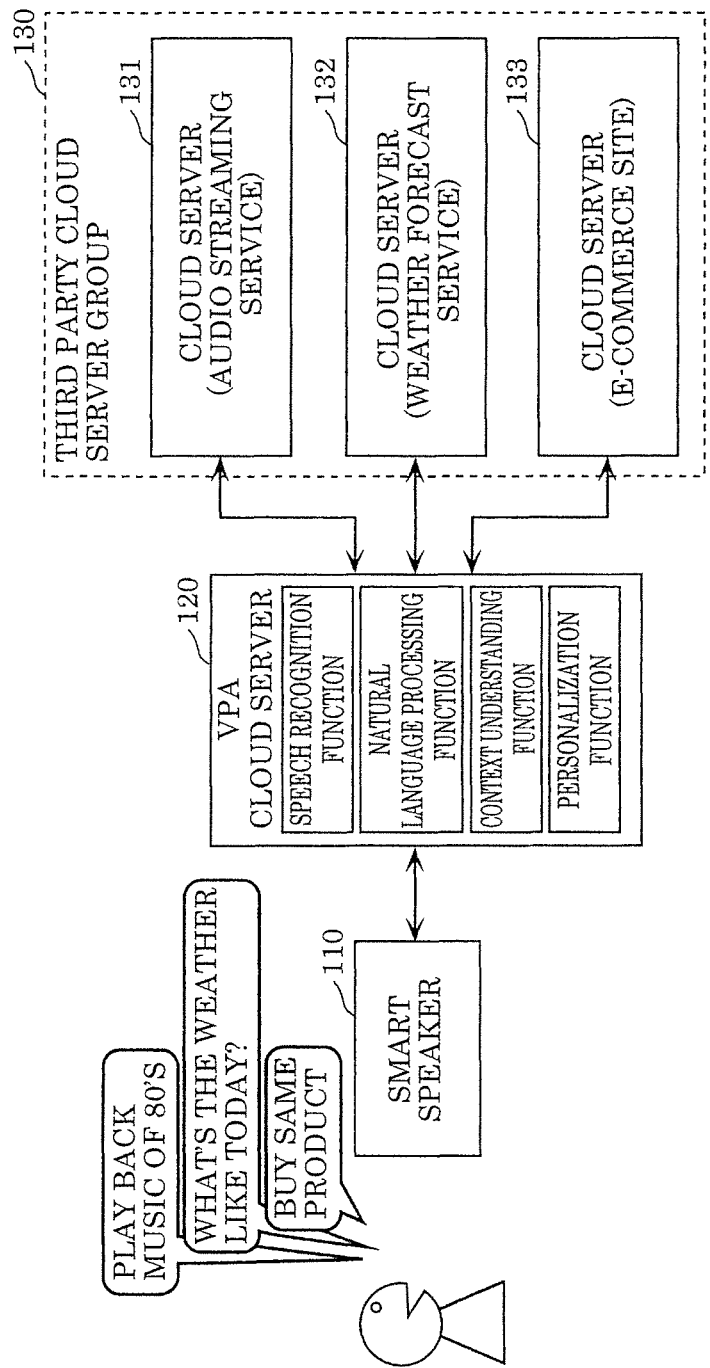
FIG. 1 is a diagram for illustrating functions of a smart speaker.

Such services have been provided firstly as applications for smartphones and personal computers, and recently as applications for stand-alone products called smart speakers. The smart speakers are speakers which can be operated by speech of users, and are mainly intended to receive provision of music streaming services. In other words, main functions of the smart speakers are playback of music that is provided through audio streaming services according to speech of the users. FIG. 1 is a diagram for illustrating functions of a smart speaker.

Main functions of smart speaker 110 are implemented as described below. A speech signal of speech of a user obtained by smart speaker 110 is transmitted to VPA cloud server 120. VPA cloud server 120 performs a speech recognition process on the received speech signal, and transmits a command to cloud server 131 which provides an audio streaming service. Cloud server 131 transfers music to smart speaker 110 based on the received command.

Such a mechanism can be applied not only to cloud server 131 which provides the audio streaming service but also to other cloud servers included in third party cloud server group 130. When a third party cloud I/F is provided to a VPA service provider by a service provider of third party cloud server group 130, the user can use services that are provided by third party cloud server group 130 through smart speaker 110 in a similar manner to the case of using the services through a smartphone.

For example, by means of the user uttering "[w]hat's the weather like today?", the user can receive provision of weather forecast information from cloud server 132 which provides a weather forecast service. Specifically, speech like "[i]t's sunny" is output from smart speaker 110. In addition, when product purchase history of the user is stored in cloud server 133 which provides an e-commerce site, the user can purchase the same one of the products by uttering "[b]uy the same product" toward smart speaker 110.

Such various kinds of interactive functions through smart speaker 110 can be implemented by means of a microphone of smart speaker 110 installed in a home, or the like recording speech of a user, sound from a television receiver, sound from a radio, etc. and transferring them to VPA cloud server 120. VPA cloud server 120 converts a speech signal into text using an automatic speech recognition (ASR) function, and converts the text into machine language using a natural language processing (NLP) function. VPA cloud server 120 further converts the machine language into words having meaning suitable for particular context using a context understanding function, and lastly converts the words to instruction details according to user information using a personalization function. VPA cloud server 120 can call third party cloud server group 130 by transmitting such instruction details as a command.

Figure 2:
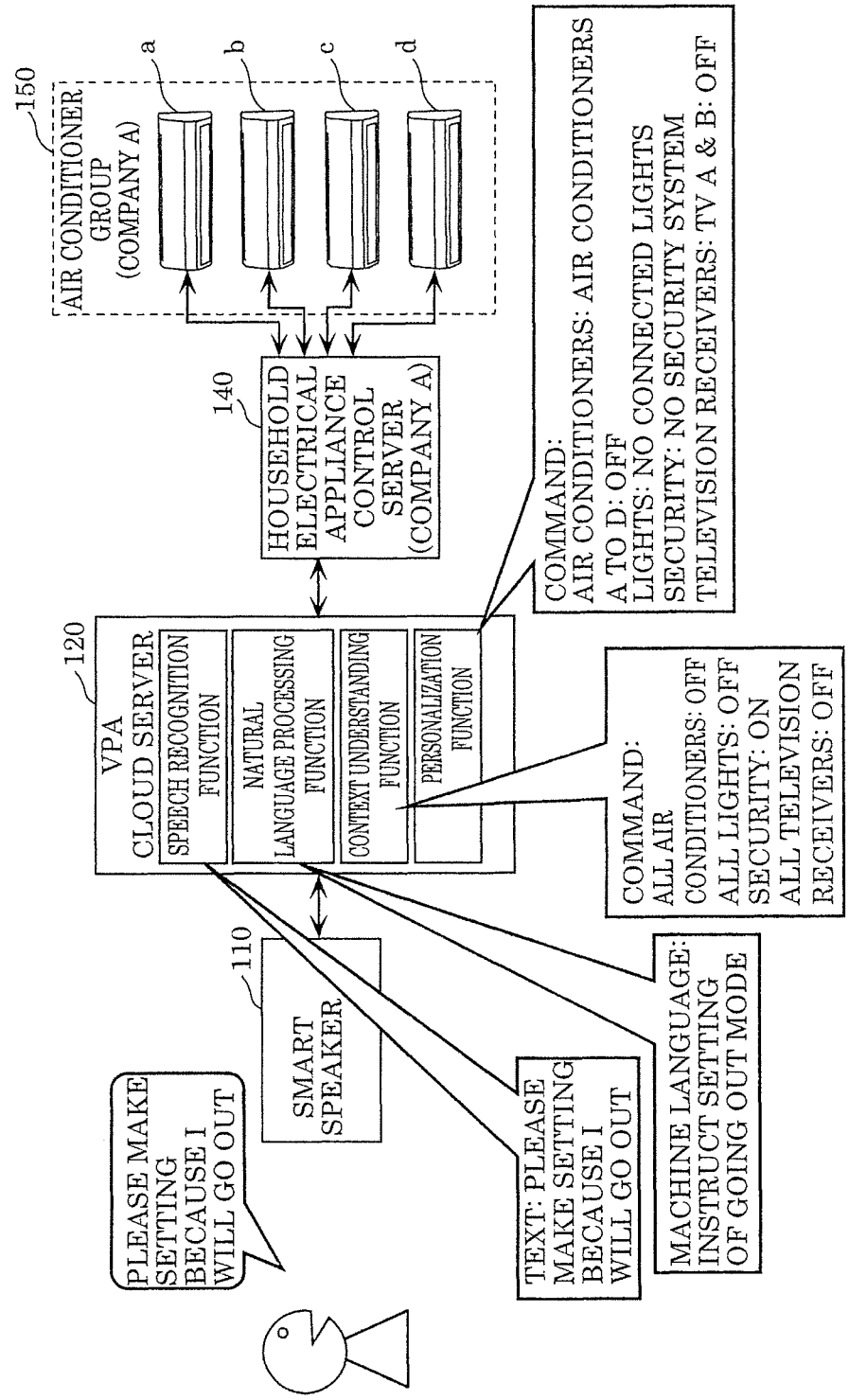
FIG. 2 is a diagram for illustrating how household electrical appliances are controlled using the smart speaker.

In addition, the use of smart speaker 110 makes it also possible to control household electrical appliances in a home by the VPA of VPA cloud server 120. FIG. 2 is a diagram for illustrating how household electrical appliances are controlled using smart speaker 110.

As illustrated in FIG. 2, when VPA cloud server 120 is connected to household electrical appliance control server 140, it is possible to control, by speech, air conditioners, lights, a security system, television receivers, etc. in the home of the user.

FIG. 2 illustrates an example of air conditioner group 150 including air conditioner a to air conditioner d as control target devices. When the user utters "[m]ake a setting because I will go out", a speech signal of the speech is transmitted to VPA cloud server 120. VPA cloud server 120 converts the speech signal into text by the speech recognition function, and converts the text into machine language that instructs the setting of a going out mode by the natural language processing function. In addition, VPA cloud server 120 converts the machine language that instructs the setting of the going out mode into a command of turning off the electrical devices in the user's home by the context understanding function, and converts the command into a command of turning off four air conditioners based on user information by the personalization function. In this way, under the household electrical appliance control using the VPA, the four air conditioners a to d are turned off by means of the user uttering "Wake a setting because I will go out". In other words, under the household electrical appliance control using the VPA, the function exceeding the function of turning off individual air conditioners a to d using a remote controller can be implemented.

In the case where the user uses such a VPA by a smartphone, the user can activate the VPA by either operating a button of the smartphone or performing an operation such as touching an icon displayed on the smartphone.

However, in the case where the user uses the VPA by smart speaker 119, when the user activates the VPA by operating a button of smart speaker 110, the user cannot obtain the advantage of smart speaker 110 allowing the user to perform an operation by speech without using his/her hands. For this reason, when the VPA is used through smart speaker 110, it is desirable that the VPA be activated by speech. For example, a conceivable configuration is the one in which an activation word is defined in advance and the VPA is activated by means of the activation word being recognized by VPA cloud server 120. The activation word may be called a wake word, or the like.

However, in such a configuration, a speech signal always needs to be transferred to VPA cloud server 120 through a microphone of smart speaker 110. In such circumstances, the user is concerned about leakage of his/her privacy. Accordingly, it is difficult to employ such a configuration with consideration of the user's privacy.

For this reason, a configuration in which speech recognition of an activation word is performed in smart speaker 110 is employed. A speech signal of speech obtained by the microphone of smart speaker 110 is transferred to VPA cloud server 120 after the VPA is activated. FIG. 3 is a diagram indicating the relationship between services and activation words.

As illustrated in FIG. 3, at present, the user uses activation words specified by the VPA service provider both when calling VPA provision services (services other than household electrical appliance control services) such as an audio streaming service, a weather forecast service, and an e-commerce site and when calling the household electrical appliance control services. Assuming that the VPA service provider is company B, examples of activation words include "[c]ompany B" and "[h]ey, company B".

After the VPA is activated, the user can call one of the VPA provision services and household electrical appliance control services by uttering a function activation word and command details toward smart speaker 110.

For example, when company A which manufactures and sells air conditioner group 150 described above provides a household electrical appliance control service, the user utters "[c]ompany A" as a function activation word and "[t]urn on air conditioners" as the command details for instructing the control targets and control details. In this way, air conditioner group 150 in the home can be controlled.

Figure 4:
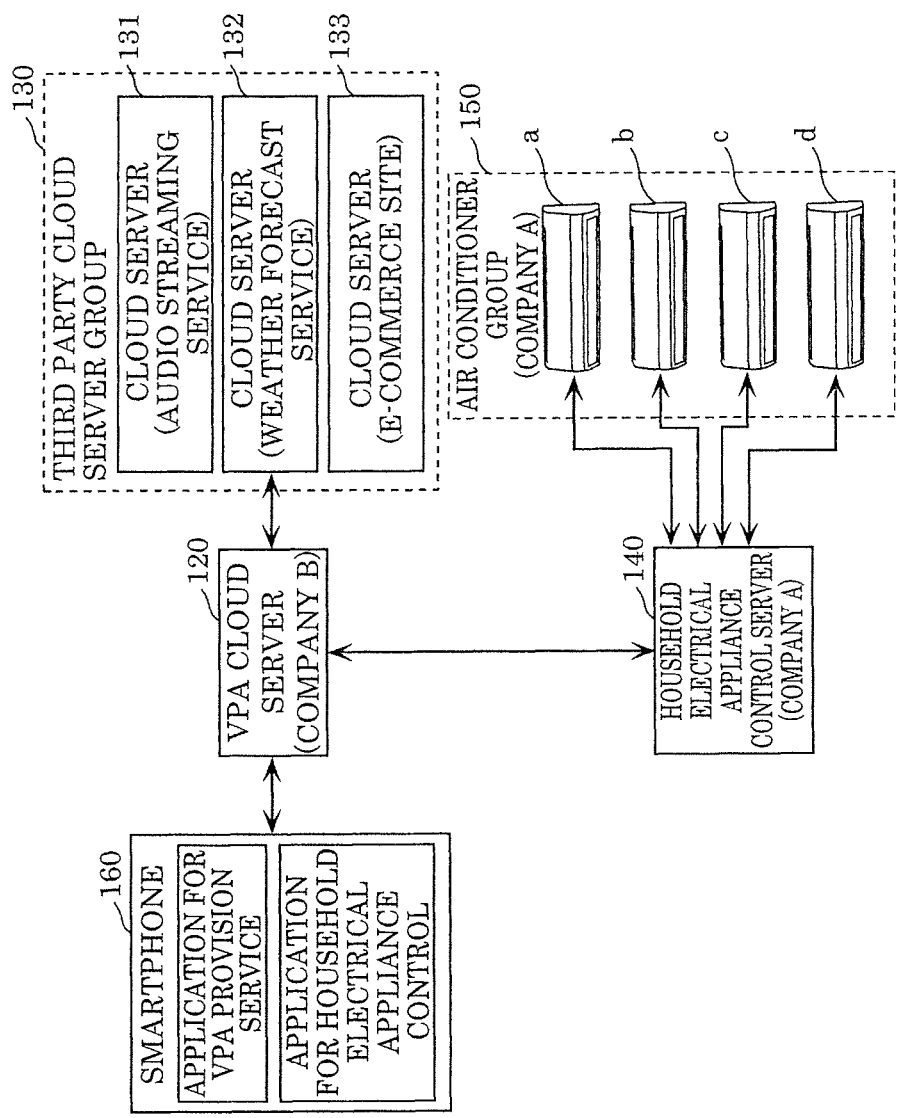
FIG. 4 is a diagram for illustrating a case in which a user calls a service using a smartphone.

As illustrated in FIG. 4, when the user uses the smartphone, applications used to call VPA provision services and applications used to call household electrical appliance control services are normally different. FIG. 4 is a diagram for illustrating a case in which a user calls a service using a smartphone. For this reason, the user recognizes that the world of the VPA provision services and the world of the household electrical appliance control services are different worlds, and considers that there are two different service systems.

The user who recognizes that there are two different service systems in this way may purchase and use a VPA device such as smart speaker 110 manufactured and sold by company A. The user feels like executing an application using a smartphone when using an activation word specified by the VPA service provider when calling the VPA provision service. For this reason, the user can perform such an operation naturally without feeling strange.

However, the use of an activation word specified by the VPA service provider when calling a household electrical appliance control service may cause the user to feel strange.

For example, when control target household electrical appliances and a VPA device are assigned with a logo of company A which is a manufacturer and seller thereof, it is unnatural for the user to utter activation words such as "[c]ompany B" and "[h]ey, company B" specified by the VPA service provider in order to control the household electrical appliances of company A.

In addition, the user may misunderstand that the provider of the household electrical appliance control service is not company A but the VPA service provider (that is, company B). When household electrical appliance control service is not provided due to a trouble occurred in household electrical appliance control server 140, the user may think the trouble is caused by a problem in the VPA service provider and take a phone call to a call center of the VPA service provider. When the activation words specified by the VPA service provider are used in this way, there is a problem that it is difficult for the user to find out the service provider (that is, the responsible company).

In view of this, the inventors have arrived at the configuration of smart speaker 110 capable of activating a speech recognition system using an activation word other than activation words specified by VPA service providers. In addition, the inventors have arrived at the configuration of smart speaker 110 capable of connecting to a plurality of VPA cloud servers.

Hereinafter, embodiments are specifically described with reference to the drawings. It is to be noted that each of the embodiments described below indicates a generic or a specific example. The numerical values, shapes, materials, constituent elements, the arrangement and connection of the constituent elements, steps, the processing order of the steps etc. indicated in the following exemplary embodiments are mere examples, and therefore do not limit the scope of the present disclosure. In addition, among the constituent elements in the following embodiments, constituent elements not recited in any one of the independent claims that define the most generic concept are described as optional constituent elements.

It is to be noted that each of the drawings is a schematic diagram, and is not always precisely illustrated. In the respective drawings, substantially the same constituent elements are assigned with the same reference signs, and overlapping descriptions may be omitted or simplified.

Embodiment 1

[Configuration]

Figure 5:
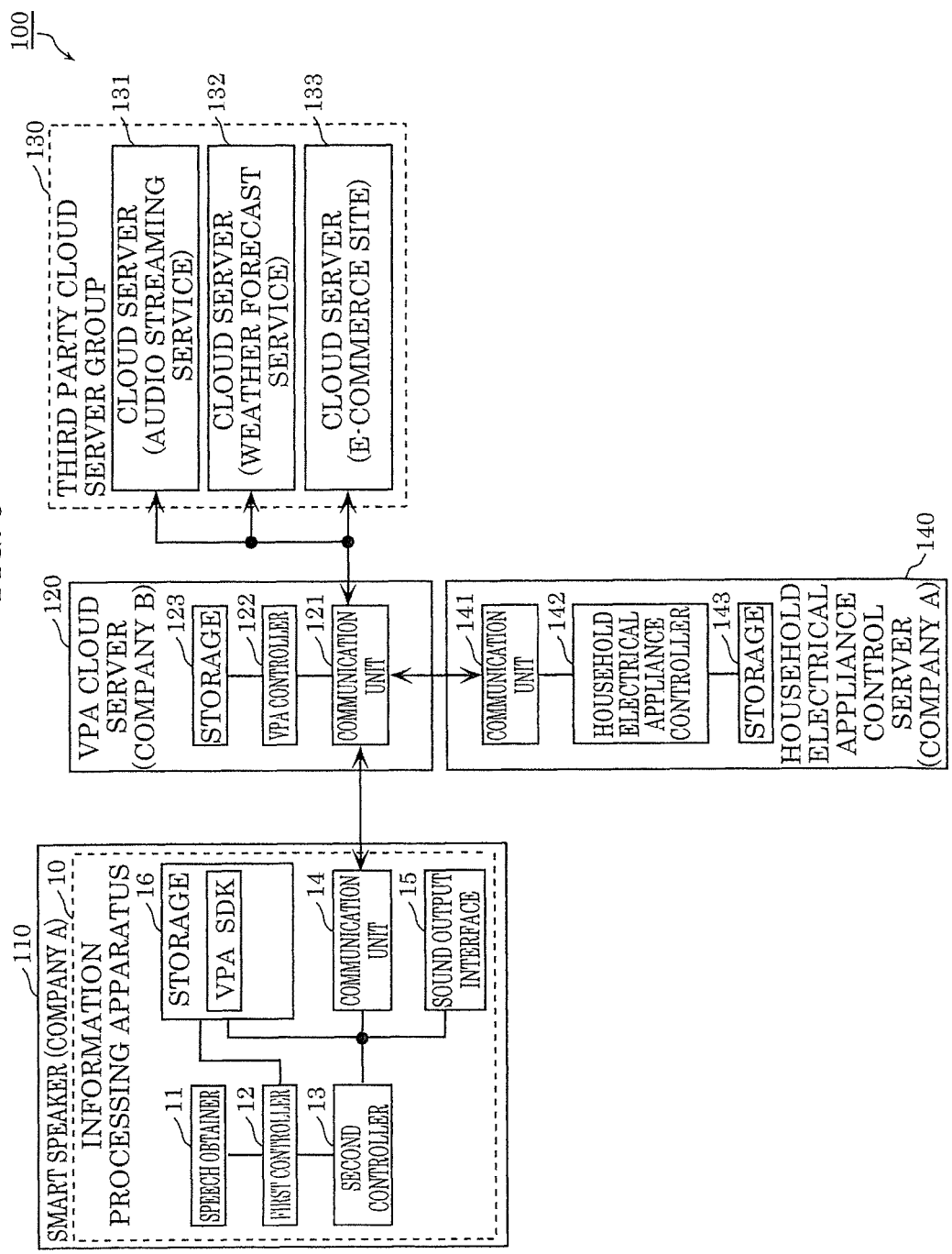
FIG. 5 is a block diagram indicating a configuration of a speech recognition system according to Embodiment 1.

Hereinafter, a description is given of a configuration of a speech recognition system according to Embodiment 1. FIG. 5 is a block diagram indicating a configuration of the speech recognition system according to Embodiment 1.

As illustrated in FIG. 5, speech recognition system 100 according to Embodiment 1 includes smart speaker 110, VPA cloud server 120, third party cloud server group 130, household electrical appliance control server 140, and air conditioner group 150. Smart speaker 110 and air conditioner group 150 are installed in a user's home.

In speech recognition system 100, a speech signal of speech obtained by speech obtainer 11 of smart speaker 110 is transmitted to VPA cloud server 120, and is subjected to a speech recognition process. It is to be noted that the activation word described above is subjected to a speech recognition process in smart speaker 110. Hereinafter, detailed descriptions are given of smart speaker 110, VPA cloud server 120, and household electrical appliance control server 140 which constitute speech recognition system 100.

[Smart Speaker]

Smart speaker 110 includes, as a speech user interface, information processing apparatus 10 which transmits a speech signal to VPA cloud server 120. Information processing apparatus 10 includes speech obtainer 11, first controller 12, second controller 13, communication unit 14, sound output interface 15, and storage 16.

Speech obtainer 11 obtains speech of a user. Specifically, speech obtainer 11 is a microphone.

First controller 12 is located between speech obtainer 11 and second controller 13, obtains a speech signal of user's speech from speech obtainer 11, and always monitors user's speech. In other words, first controller 12 is located on a speech path from speech obtainer 11 to second controller 13. When first controller 12 recognizes that the speech obtained by speech obtainer 11 is a first activation word, first controller 12 outputs a speech signal corresponding to a second activation word specified by the VPA service provider (that is, company B). Here, the first activation word is different from the second activation word, and is, for example, a hardware specification activation word specified by a hardware provider (that is, company A that is the manufacturer and seller of smart speaker 110).

In this way, first controller 12 converts the first activation word into the second activation word, and outputs the second activation word to second controller 13. In this way, the user utters the first activation word, and even when the first activation word was obtained by speech obtainer 11, second controller 13 recognizes that the second activation word was obtained. Second controller 13 which recognizes that the second activation word was obtained performs an activation process for turning on the VPA function as conventionally according to a VPA software development kit (SDK) provided by the VPA service provider. In other words, according to first controller 12, it is possible to cause second controller 13 to perform the activation process triggered by the first activation word. When the hardware specification activation word is used as the first activation word, such a function of first controller 12 is described also as a hardware specification activation word searching function.

It is to be noted that, in Embodiment 1, first controller 12 outputs the speech signal corresponding to the second activation word when first controller 12 recognizes that the speech signal of the speech obtained by speech obtainer 11 is the second activation word. In this way, second controller 13 can perform the activation process irrespective of whether the speech obtained by speech obtainer 11 is the first activation word or the second activation word.

First controller 12 described above is implemented as a microcomputer for example, but may be implemented as a processor.

When second controller 13 recognizes that the speech signal output by first controller 12 indicates the second activation word, second controller 13 performs an activation process for starting transmission of the speech (more specifically, the speech signal of the speech obtained by speech obtainer 11) obtained by speech obtainer 11 to VPA cloud server 120. Specifically, second controller 13 executes the VPA SDK stored in storage 16. Second controller 13 described above is implemented as a microcomputer for example, but may be implemented as a processor.

After the VPA function is turned on, communication unit 14 transmits the speech signal to communication unit 121 of VPA cloud server 120 under control of second controller 13. Communication unit 14 is specifically a communication module. The communication module is, in other words, a communication circuit. Communication unit 14 may perform wired communication, or wireless communication. It is to be noted that a relay device such as a broad band rooter and a communication network such as the Internet which are not illustrated in the drawings are present between communication unit 14 and communication unit 121.

Sound output interface 15 outputs sound under control of second controller 13. Sound output interface 15 outputs, for example, music that is transferred from cloud server 131 that provides the audio streaming service to communication unit 14. Sound output interface 15 is, for example, a speaker.

Storage 16 is a storage device which stores a program for speech recognition which is executed by first controller 12 to recognize the first activation word and the second activation word and the VPA SDK which is executed by second controller 13. In addition, storage 16 may store speech data that first controller 12 reads to output the speech signal corresponding to either the first activation word and the second activation word. Storage 16 may be used as a buffer memory in which the speech obtained by speech obtainer 11 is temporarily stored as speech data. Storage 16 is, specifically, implemented as a semiconductor memory.

[VPA Cloud Server]

VPA cloud server 120 implements either the VPA provision service or household electrical appliance control service by receiving the speech signal of the speech obtained by speech obtainer 11 after smart speaker 110 is activated (after the VPA function is turned on), and performing a speech recognition process on the received speech signal. VPA cloud server 120 is an example of a speech recognition server. VPA cloud server 120 includes communication unit 121, VPA controller 122, and storage 123.

Communication unit 121 receives a speech signal that is transmitted by communication unit 14 of smart speaker 110. In addition, communication unit 121 transmits a command to either third party cloud server group 130 or household electrical appliance control server 140, under control of VPA controller 122. Communication unit 121 is specifically a communication module. The communication module is, in other words, a communication circuit.

VPA controller 122 performs a speech recognition process on the speech signal received by communication unit 121, and causes communication unit 121 to transmit the command obtained as a result of the speech recognition process. As described above, in the speech recognition process, the following functions are used: a speech recognition function, a natural language processing function, a context understanding function, and a personalization function. VPA controller 122 is implemented as a microcomputer for example, but may be implemented as a processor.

Storage 123 is a storage device which stores, for example, a program for speech recognition which is executed by VPA controller 122 to perform a speech recognition process. In addition, third party cloud I/Fs are also stored in storage 123. The third party cloud I/Fs are programs corresponding to various kinds of services which are provided by third party cloud server group 130. Storage 123 is, specifically, implemented as a semiconductor memory.

[Household Electrical Appliance Control Server]

Household electrical appliance control server 140 receives a command from VPA cloud server 120, and provides a household electrical appliance control service to the user by controlling air conditioner group 150 based on the received command. It is to be noted that air conditioner group 150 is an example of a control target household electrical appliance, and a household electrical appliance other than the air conditioner may be the control target household electrical appliance. Household electrical appliance control server 140 includes communication unit 141, household electrical appliance controller 142, and storage 143.

Communication unit 141 receives a command that is transmitted by communication unit 121 of VPA cloud server 120. In addition, communication unit 141 transmits a control signal to air conditioner group 150 under control of household electrical appliance controller 142. Communication unit 141 is specifically a communication module. The communication module is, in other words, a communication circuit.

Household electrical appliance controller 142 transmits a control signal according to a command received by communication unit 141 to communication unit 141. Household electrical appliance controller 142 is implemented as a microcomputer for example, but may be implemented as a processor.

Storage 143 is a storage device which stores, for example, a control program for allowing household electrical appliance controller 142 to control air conditioner group 150. Storage 143 is, specifically, implemented as a semiconductor memory.

[Operations]

Figure 6:
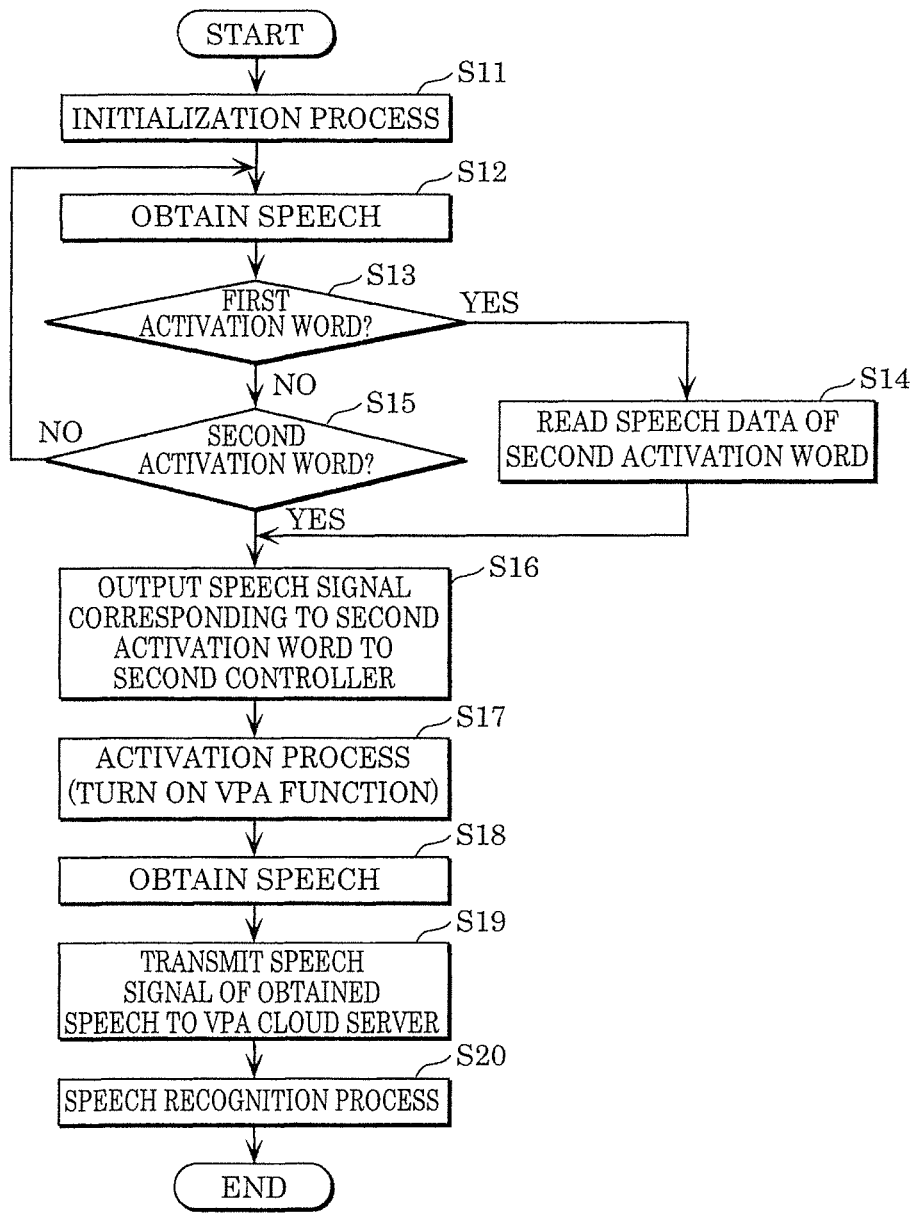
FIG. 6 is a flowchart indicating operations performed by the speech recognition system according to Embodiment 1.

Next, operations performed by speech recognition system 100 are described. FIG. 6 is a flowchart of the operations performed by speech recognition system 100.

First, second controller 13 of smart speaker 110 performs an initialization process (S11). The initialization process is performed when, for example, power supply to smart speaker 110 is started. Smart speaker 110 is placed into a standby state in which the first activation word and the second activation word can be recognized though the initialization process. It is to be noted that transmission of the speech signal to VPA cloud server 120 is stopped in the standby state.

Next, speech obtainer 11 obtains speech of a user (S12). First controller 12 performs a speech recognition process of the speech signal of the obtained speech, and determines whether the speech obtained by speech obtainer 11 is the first activation word (S13). As described above, the first activation word is, for example, a hardware specification activation word specified by a hardware provider (that is, company A that is the manufacturer and seller of smart speaker 110). The first activation word is, for example, "[c]ompany A".

When first controller 12 determined that the speech obtained by speech obtainer 11 is the first activation word (Yes in S13), first controller 12 reads out speech data corresponding to the second activation word stored in storage 16 in advance (S14), and outputs the speech signal corresponding to the second activation word to second controller 13 (S16). The second activation word is an activation word specified by VPA service provider (that is, company B). The second activation word is, for example, "[c]ompany B", "[h]ey, company B", or the like.

When first controller 12 determined that the speech obtained by speech obtainer 11 is not the first activation word (No in S13), first controller 12 determines whether the speech obtained by speech obtainer 11 is the second activation word (S15).

When first controller 12 determined that the speech obtained by speech obtainer 11 is the second activation word (Yes in S15), first controller 12 outputs speech signal corresponding to the second activation word to second controller 13 (S16). In this case, for example, first controller 12 temporarily stores the speech signal of the speech obtained in Step S12 in storage 16, and outputs the stored speech signal to second controller 13. However, it is to be noted that the speech data corresponding to the second activation word stored in storage 16 in advance may be read out as in Step S14. When first controller 12 determined that the speech obtained by speech obtainer 11 is not the second activation word (No in S15), the standby state is continued, and speech obtainment by speech obtainer 11 is performed (S11).

It is to be noted that, in the standby state, speech signals of speech other than the first activation word and the second activation word obtained by speech obtainer 11 may be output to second controller 13 through first controller 12, and output of the speech signals to second controller 13 may be stopped by first controller 12.

When the speech signal corresponding to the second activation word is output by first controller 12 (S16), second controller 13 recognizes that the speech signal is of the second activation word, and performs an activation process (S17). The activation process is a process for starting transmission of the speech signal of the speech obtained by speech obtainer 11 to VPA cloud server 120. As a result, the VPA function is turned on.

Speech obtainer 11 continues to obtain speech after the activation process (S18). Second controller 13 transmits in real time the speech signal of the speech obtained by speech obtainer 11 after the activation process to VPA cloud server 120 using communication unit 14 (S19).

Communication unit 121 of VPA cloud server 120 receives a speech signal from communication unit 14, and performs a speech recognition process on the obtained speech signal (S20). As a result, various kinds of services are provided to the user according to the speech obtained in Step S18.

As described above, in speech recognition system 100, first controller 12 converts the first activation word into the second activation word, and outputs the second activation word to second controller 13. In this way, even when the user utters the first activation word and the first activation word was obtained by speech obtainer 11, second controller 13 recognizes that the second activation word was obtained. Second controller 13 which recognizes that the second activation word was obtained is capable of performing an activation process for turning on the VPA function according to the VPA SDK that is provided by the VPA service provider conventionally, and turning on the VPA function. In other words, according to first controller 12, it is possible to turn on the VPA function triggered by the first activation word without modifying the VPA SDK.

In addition, first controller 12 outputs the speech signal corresponding to the second activation word when first controller 12 recognizes that the speech obtained by speech obtainer 11 is the second activation word. In this way, second controller 13 can perform the activation process irrespective of whether the speech obtained by speech obtainer 11 is the first activation word or the second activation word, and turn on the VPA function. FIG. 7 is a diagram indicating the relationship between services and activation words according to Embodiment 1. As illustrated in FIG. 7, in Embodiment 1, words specified by company A (that are, first activation words) are added as activation words, in addition to words (that are, second activation words) specified by the VPA service provider.

In such a configuration, the user can selectively use a first activation word and a second activation word, for example, by uttering the second activation word when the user would like to receive a VPA provision service and uttering the first activation word when the user would like to receive a household electrical appliance control service. Such selective use is similar to selective use of applications in smartphone 160 described with reference to FIG. 4, and thus is considered to be less strange to the user.

It is to be noted that such activation words may be specified by the user. For example, the name of a pet of the user, etc. may be used as indicated in FIG. 7. In this case, storage 16 stores a speech recognition program for setting the activation word to the user-specified word based on speech of the user.

Embodiment 2

As illustrated in FIG. 7, for example, after a user activates smart speaker 110 by uttering "[c]ompany A" that is a first activation word in order to cause air conditioners to operate in a going out mode, the user utters "[c]ompany A" as a function activation word and further utters "going out mode" as command details. In other words, the user needs to utter "[c]ompany A" twice.

Here, when the first activation word is the name of a company that is a manufacturer and seller of household electrical appliances such as "[c]ompany A", it is highly likely that a user utters a function activation word for receiving a household electrical appliance control service next to a first activation word. In such a case, when first controller 12 recognizes that speech obtained by speech obtainer 11 is the first activation word, not only a speech signal corresponding to a second activation word but also a speech signal corresponding to a function activation word may be further output. FIG. 8 is a flowchart of the operations performed by speech recognition system 100. In Embodiment 2, the differences from the flowchart of FIG. 6 are mainly described below, and descriptions of already described matters may be omitted.

In Embodiment 2, a function activation word may be also described as a specification word. As described above, VPA cloud server 120 transmits a command to another server according to the result of speech recognition of the speech signal received from smart speaker 110 (that is, information processing apparatus 10) after an activation process. The specification word is a word for designating a server that is the transmission destination of the command.

As in Embodiment 1, first controller 12 determines whether the speech obtained by speech obtainer 11 is a first activation word in Step S13 (S13). When first controller 12 determined that the speech obtained by speech obtainer 11 is the first activation word (Yes in S13), first controller 12 reads out speech data corresponding to a second activation word stored in storage 16 in advance (S14). First controller 12 then turns on a specification word transmission mode (S21). Specifically, for example, first controller 12 sets a flag corresponding to the specification word transmission mode in storage 16.

Subsequently, first controller 12 outputs the speech signal corresponding to the second activation word (S16), second controller 13 recognizes that the speech signal indicates the second activation word and performs an activation process (S17).

Speech obtainer 11 continues to obtain speech after the activation process (S18). Here, first controller 12 determines whether the specification word transmission mode is on (S22). Specifically, first controller 12 determines whether the flag corresponding to the specification word transmission mode is set with reference to storage 16.

When first controller 12 determined that the flag corresponding to the specification word transmission mode is on (Yes in S22), first controller 12 reads out speech data corresponding to the specification word stored in storage 16 in advance, and outputs the speech signal corresponding to the specification word to second controller 13. In response, second controller 13 causes communication unit 14 to transmit the speech signal corresponding to the specification word to VPA cloud server 120 (S23).

Subsequently, second controller 13 causes communication unit 14 to transmit the speech signal of the speech obtained by speech obtainer 11 after the activation process (S19). When first controller 12 determined that the specification word transmission mode is not on (No in S22), Step S23 is omitted.

As described above, in the flowchart of FIG. 8, when first controller 12 recognizes that the speech obtained by speech obtainer 11 is the first activation word (Yes in S13), first controller 12 outputs the speech signal corresponding to the second activation word (S16), and further outputs the speech signal corresponding to the specification word (S23). The speech signal corresponding to the specification word is output although the user did not utter the specification word and speech obtainer 11 did not obtain any speech corresponding to the specification word.

In this way, the user can omit uttering the specification word. As illustrated in FIG. 9, when a speech signal corresponding to "[c]ompany A" is transmitted as a specification word, the user can omit uttering "[c]ompany A". FIG. 9 is a diagram indicating the relationship between services and activation words according to Embodiment 2.

Automatic transmission of such a specification word is useful when the user selectively uses a first activation word and a second activation word by uttering the second activation word when the user would like to receive a VPA provision service and uttering the first activation word when the user would like to receive a household electric appliance control service.

It is to be noted that the specification word is, for example, "[c]ompany A" that is the same as the first activation word. In other words, first controller 12 outputs the speech signal corresponding to the first activation word as the speech signal corresponding to the specification word. However, the specification word and the first activation word may be different from each other. For example, based on FIG. 9, the first activation word may be "[c]ompany A", and the specification word may be "television receiver".

Embodiment 3

Figure 10:
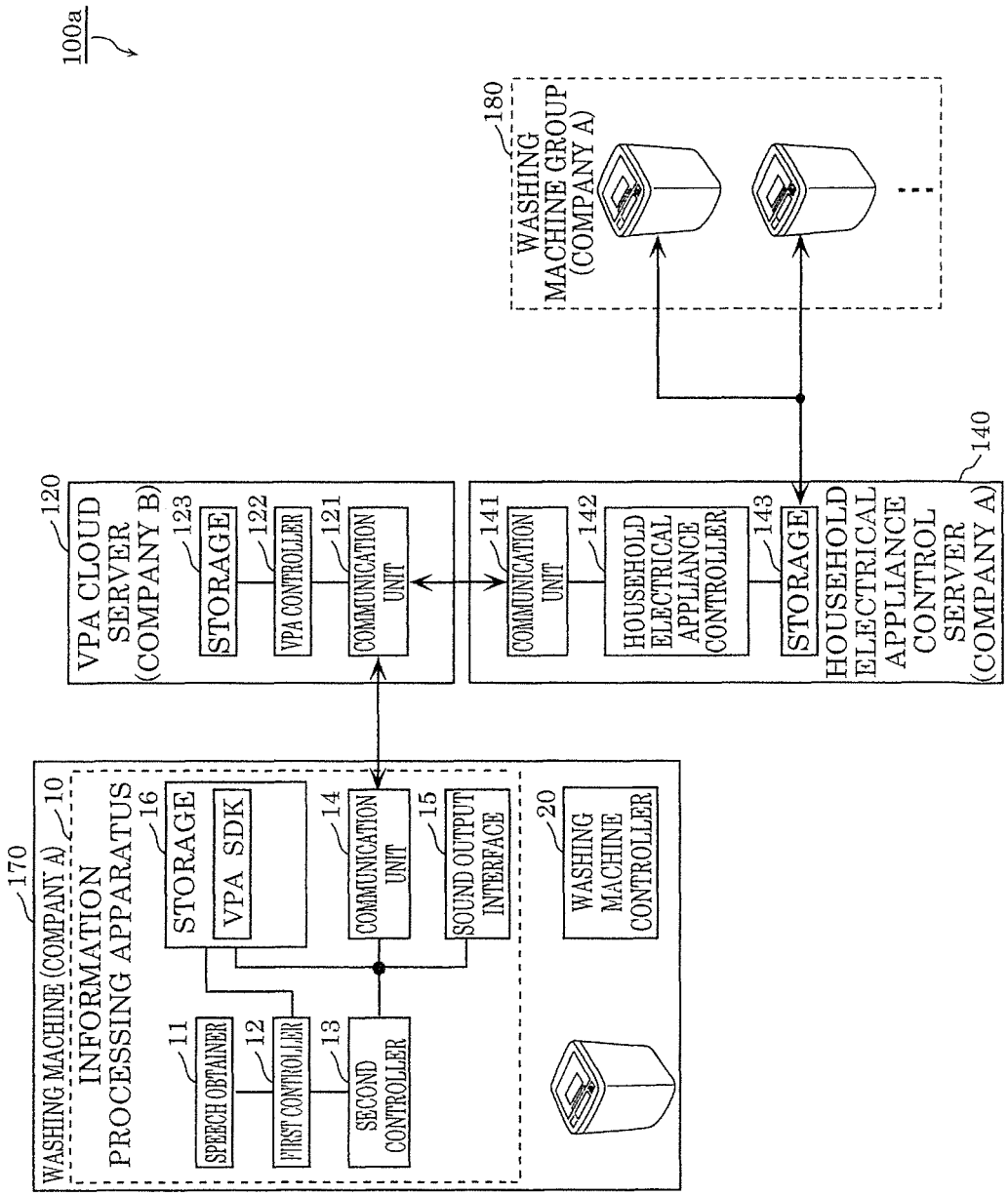
FIG. 10 is a block diagram indicating a configuration of a speech recognition system according to Embodiment 3.

Information processing apparatus 10 may be mounted on a household electrical appliance other than smart speaker 110. For example, information processing apparatus 10 may be mounted on a washing machine. FIG. 10 is a block diagram indicating a configuration of a speech recognition system according to Embodiment 3.

As illustrated in FIG. 10, speech recognition system 100a according to Embodiment 3 includes washing machine 170, VPA cloud server 120, household electrical appliance control server 140, and washing machine group 180. Washing machine 170 is installed in a user's home, or the like, and is included in washing machine group 180.

Washing machine 170 includes information processing apparatus 10, in addition to washing control unit 20 for implementing a washing function. In other words, washing machine 170 is a household electrical appliance corresponding to VPA. Washing machine 170 is, for example, a household electrical appliance that is manufactured and sold by company A.

For example, the user utters "[l]et me know when washing is done" after pressing a washing start button of washing machine 170. In response, after the washing is done, an end message is transmitted to smartphone 160 of the user via household electrical appliance control server 140.

In speech recognition system 100a, it is assumed that provision of household electrical appliance control service relating to washing machine 170 is mainly received. For this reason, speech recognition system 100a does not include any third party cloud server group 130. Accordingly, it is very unnatural to use a second activation word (for example, "[c]ompany B" or "[h]ey, company B" that is specified by a VPA service provider, as an activation word for activating washing machine 170 manufactured and sold by company A.

Figure 11:
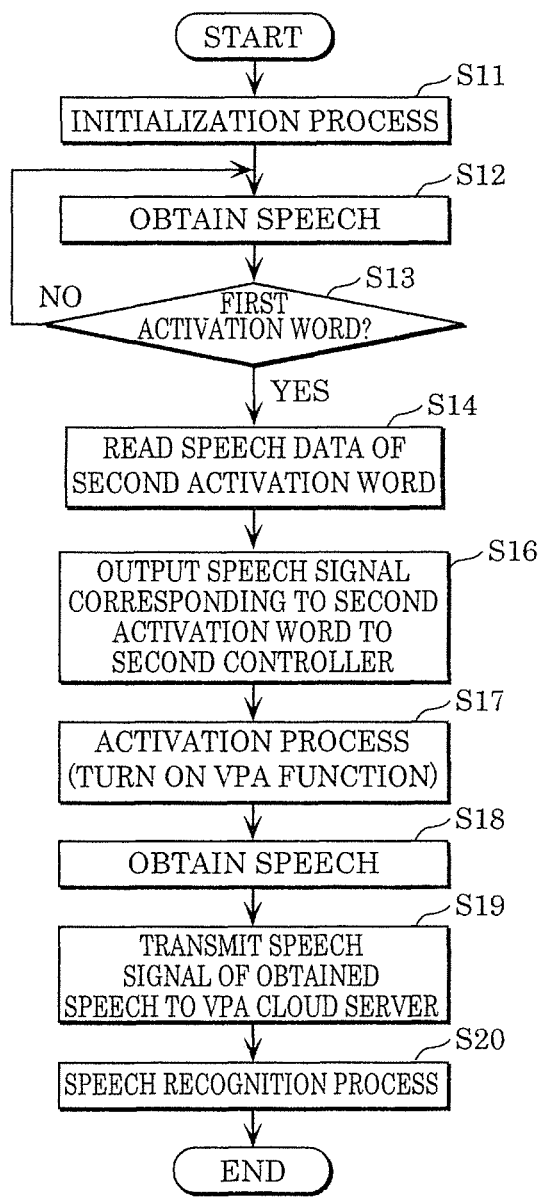
FIG. 11 is a flowchart indicating operations performed by the speech recognition system according to Embodiment 3.

For this reason, in speech recognition system 100a, when first controller 12 of information processing apparatus 10 recognizes that the speech obtained by speech obtainer 11 is the second activation word, first controller 12 does not output a speech signal corresponding to the second activation word. In other words, second activation word is masked by first controller 12. FIG. 11 is a flowchart of the operations performed by speech recognition system 100a.

In the flowchart of FIG. 11, Step S15 indicated by the flowchart of FIG. 6 is omitted. When it was determined that the speech obtained by speech obtainer 11 is not the first activation word in Step S13 (No in S13), a standby state is continued, and speech obtainment by speech obtainer 11 is performed (S11).

In short, in speech recognition system 100a, it is possible to turn on a VPA function by the first activation word, but it is impossible to turn on a VPA function by the second activation word. In other words, in speech recognition system 100a, activation words are changed from the second activation word specified by the VPA service provider to the first activation word specified by the hardware provider.

In this way, the second activation word specified by the VPA service provider is not used as the activation word for activating washing machine 170 manufactured and sold by company A, which allows the user to feel less strange.

Embodiment 4

Figure 12:
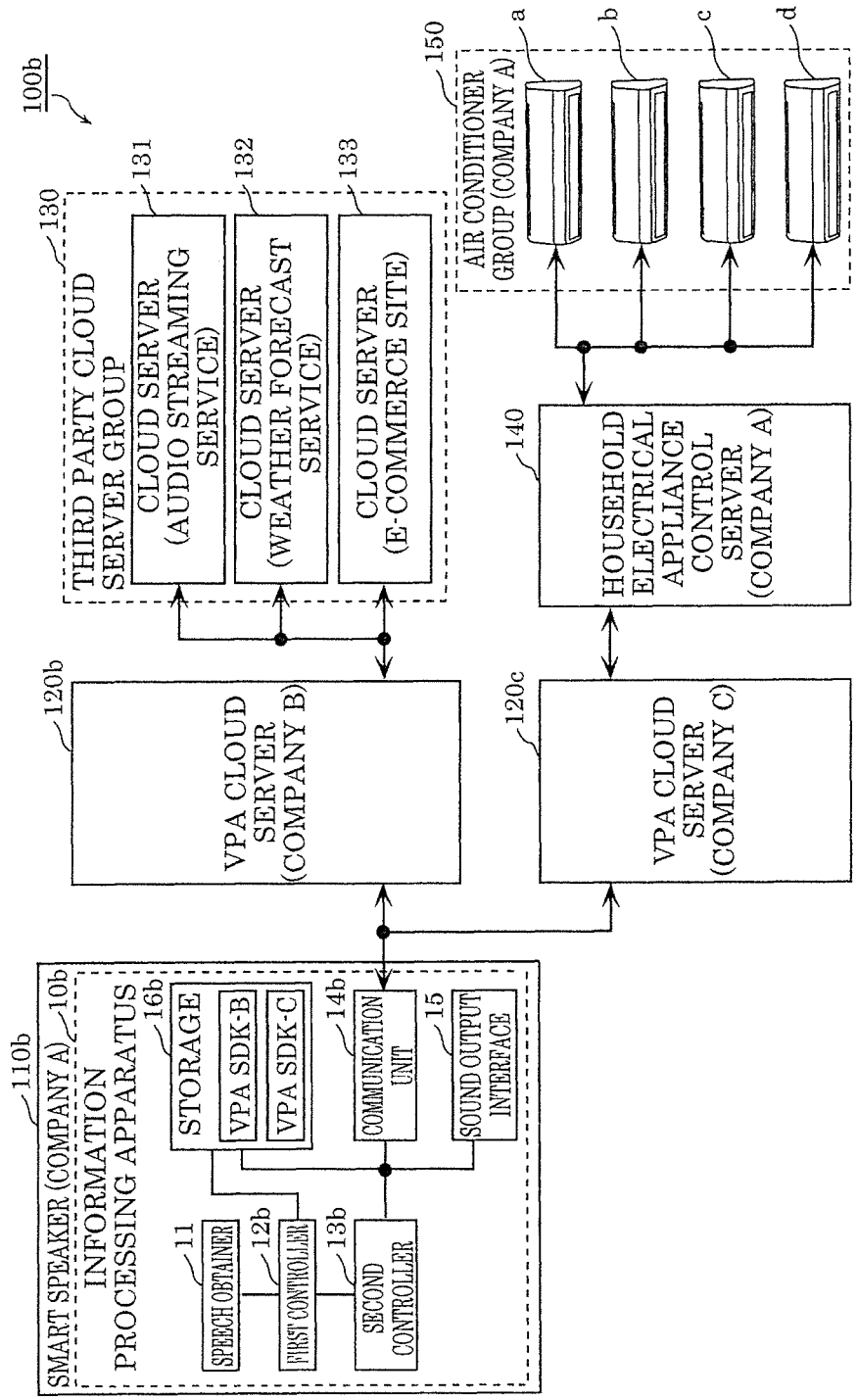
FIG. 12 is a block diagram indicating a configuration of a speech recognition system according to Embodiment 4.

In Embodiments 1 to 3, information processing apparatus 10 can be connected only to a single VPA cloud server 120. However, information processing apparatus 10 may be connected to a plurality of VPA cloud servers. FIG. 12 is a block diagram indicating a configuration of speech recognition system 100b according to Embodiment 4.

As illustrated in FIG. 12, speech recognition system 100b according to Embodiment 3 includes smart speaker 110b, VPA cloud server 120b, VPA cloud server 120c, third party cloud server group 130, household electrical appliance control server 140, and air conditioner group 150.

Smart speaker 110b includes, as a speech user interface, information processing apparatus 10b which transmits a speech signal to VPA cloud server 120b and VPA cloud server 120c. Information processing apparatus 10b includes speech obtainer 11, first controller 12b, second controller 13b, communication unit 14b, sound output interface 15, and storage 16b. Hereinafter, differences of information processing apparatus 10b from information processing apparatus 10 are described.

It is to be noted that, in Embodiment 4, definitions of a first activation word and a second activation word are different from those in Embodiments 1 to 3. In Embodiment 4, the first activation word is an activation word for allowing smart speaker 110b to connect to VPA cloud server 120b, and the second activation word is an activation word for allowing smart speaker 110b to connect to VPA cloud server 120c.

First controller 12b is positioned between speech obtainer 11 and second controller 13b, and always monitors user speech obtained by speech obtainer 11. For example, when first controller 12b recognizes that the speech obtained by speech obtainer 11 is the first activation word, first controller 12b outputs a speech signal corresponding to the first activation word to second controller 13b. In addition, first controller 12b outputs the speech signal corresponding to the second activation word to second controller 13b when first controller 12b recognizes that the speech obtained by speech obtainer 11 is the second activation word. For example, first controller 12b temporarily stores the obtained speech in storage 16b in advance, and outputs the stored speech signal to second controller 13b. First controller 12b is implemented as a microcomputer for example, but may be implemented as a processor.

When second controller 13b recognizes that the speech signal output by first controller 12b is the first activation word, second controller 13b starts a first speech transmission process for transmitting the speech signal of the speech obtained by speech obtainer 11 to VPA cloud server 120b. Specifically, second controller 13b executes a VPA SDK-B stored in storage 16b. The VPA SDK-B is provided by company B which provides a speech recognition service using VPA cloud server 120b.

In addition, when second controller 13b recognizes that the speech signal output by first controller 12b is the second activation word, second controller 13b starts a second speech transmission process for transmitting the speech signal obtained by speech obtainer 11 to VPA cloud server 120c. Specifically, second controller 13b executes a VPA SDK-C stored in storage 16b. The VPA SDK-C is provided by company C which provides a speech recognition service using VPA cloud server 120c.

Second controller 13b is implemented as a microcomputer for example, but may be implemented as a processor.

Communication unit 14b transmits the speech signal to VPA cloud server 120b in a first speech transmission process under control of second controller 13b, and transmits the speech signal to VPA cloud server 120c in a second speech transmission process under control of second controller 13b. Communication unit 14b is specifically a communication module. The communication module is, in other words, a communication circuit.

Storage 16b is a storage device which stores a speech recognition program which is executed by first controller 12b to recognize a first activation word and a second activation word, the VPA SDK-B and the VPA SDK-C which are executed by second controller 13b, etc. In addition, storage 16b stores priority level information to be described later. Storage 16b may be used as a buffer memory in which the speech signal of the speech obtained by speech obtainer 11 is temporarily stored. Storage 16b is, specifically, implemented as a semiconductor memory.

VPA cloud server 120b receives the speech signal of the speech obtained by speech obtainer 11 in the first speech transmission process, and performs a speech recognition process on the received speech signal, thereby implementing the VPA provision service. VPA cloud server 120b is an example of a first speech recognition server. The specific configuration of VPA cloud server 120b is the same as the configuration of VPA cloud server 120.

VPA cloud server 120c receives the speech signal of the speech obtained by speech obtainer 11 in the second speech transmission process, and performs a speech recognition process on the received speech signal, thereby implementing the household electrical appliance control service. VPA cloud server 120c is an example of a second speech recognition server. The specific configuration of VPA cloud server 120c is the same as the configuration of VPA cloud server 120.

In this way, in speech recognition system 100b, smart speaker 110b (specifically, information processing apparatus 10b) can be connected to two VPA cloud servers. The function of information processing apparatus 10 is also described as an activation word searching function.

In speech recognition system 100b, when the two VPA cloud servers are used to provide mutually different services, the division of roles of the two VPA cloud servers is clarified. The user may utter the first activation word when the user would like to receive a VPA provision service, and may utter the second activation word when the user would like to receive a household electrical appliance control service. For this reason, the user gets less confused about activation words.

Figure 13:
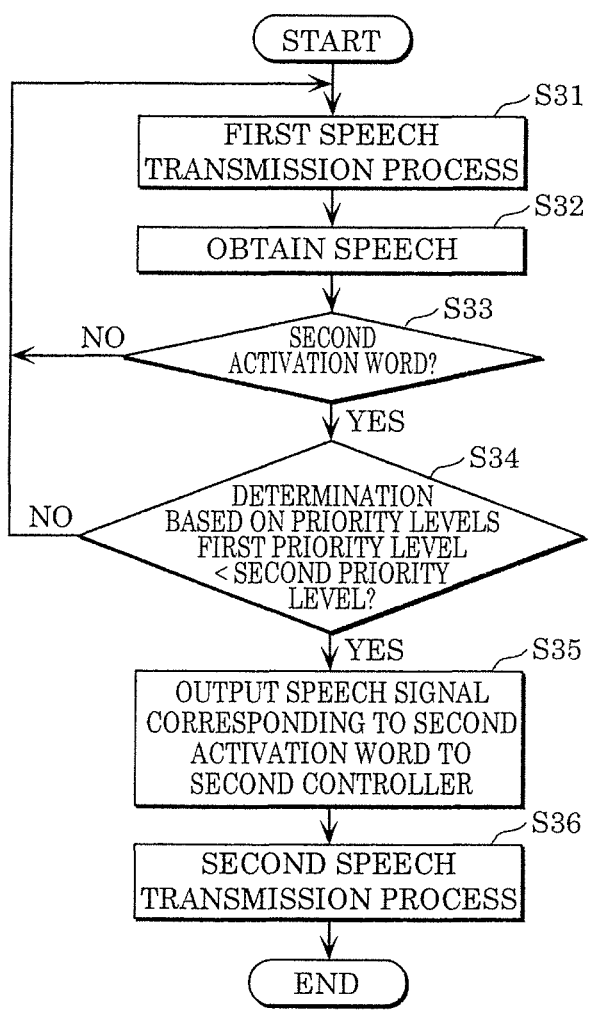
FIG. 13 is a flowchart indicating operations performed by the speech recognition system according to Embodiment 4.

In speech recognition system 100b, it is considered that the user sometimes would like to switch from one of the first speech transmission process and the second speech transmission process to the other while the one is being performed. In such a case, for example, a word for switching between the speech transmission processes, a button for switching between the speech transmission processes, or the like is prepared. Here, in speech recognition system 100b, first controller 12b may control switching from one of the first speech transmission process and the second speech transmission process to the other according to predetermined priority levels. FIG. 13 is a flowchart of the operations performed by such speech recognition system 100b. Whether to switch to the second speech transmission process while the first speech transmission process is being performed is determined in the flowchart of FIG. 13, whether to switch to the first speech transmission process while the second speech transmission process is being performed is determined by performing similar operations.

Second controller 13b performs the first speech transmission process (S31). The first speech transmission process is a process in which the speech signal of the speech obtained by speech obtainer 11 is transmitted in real time to VPA cloud server 120b. As described above, when second controller 13b recognizes that the speech signal output by first controller 12b indicates the first activation word, second controller 13b starts the first speech transmission process.

First controller 12b determines whether the speech signal of the speech obtained by speech obtainer 11 while the first speech transmission process is being performed indicates the second activation word for causing second controller 13b to start the second speech transmission process (S32). In the case where it was determined that the speech signal indicates the second activation word in Step S32 (No in S33), the first speech transmission process is continued (S31).

In the other case where it was determined that the speech signal indicates the second activation word in Step S32 (No in S33), that is, when the speech was recognized to be the second activation word by first controller 12b, first controller 12b performs a determination based on the priority levels (S34).

The priority levels are stored in storage 16b in advance as priority level information. First controller 12b refers to the priority level information stored in storage 16b in Step S34. For example, the priority levels are defined for each VPA cloud server (that is, for each activation word) that is the connection destination of smart speaker 110b. In this case, first controller 12b determines whether a first priority level of VPA cloud server 120b is lower than a second priority level of VPA cloud server 120c.

When first controller 12b determines that the priority level of VPA cloud server 120b is lower than the priority level of VPA cloud server 120c (Yes in S34), first controller 12b outputs a speech signal corresponding to the second activation word to second controller 13b (S35). Second controller 13b recognizes the speech signal to indicate the second activation word, stops the first speech transmission process and starts the second speech transmission process (S36). The second speech transmission process is a process in which the speech signal of the speech obtained by speech obtainer 11 is transmitted in real time to VPA cloud server 120c.

When first controller 12b determines that the priority level of VPA cloud server 120b is lower than the priority level of VPA cloud server 120c (No in S34), first controller 12b does not output a speech signal corresponding to the second activation word to second controller 13b. As a result, the first speech transmission process is continued (S31).

In this way, when first controller 12b recognizes that the speech obtained by speech obtainer 11 while the first speech transmission process is being performed is the second activation word, first controller 12b determines whether to output the speech signal corresponding to the second activation word to second controller 13b according to the predetermined priority levels.

In this way, speech recognition system 100b is capable of switching from the first speech transmission process to the second speech transmission process with consideration of the predetermined priority levels. It is to be noted that first controller 12b may be omitted when such operations based on priority levels as in FIG. 13 are unnecessary in speech recognition system 100b. In this case, second controller 13b obtains a speech signal directly from speech obtainer 11.

It is to be noted that priority levels may be determined for each service that is provided to a user. For example, priority levels may be determined for an audio streaming service, a weather forecast service, an e-commerce service, and a household electrical appliance control service.

In this case, when a first priority level of a service that is provided as a result of the first speech transmission process is lower than a second priority level of a service that is provided as a result of the second speech transmission process (Yes in S34), first controller 12b outputs a speech signal corresponding to the second activation word to second controller 13b (S35). In addition, when the priority level of the first service is higher than the priority level of the second service, first controller 12b does not output the speech signal corresponding to the second activation word to second controller 13b. As a result, the first speech transmission process is continued (S31).

For example, a case is conceivable in which the user would like to call a household electrical appliance control service by the second speech transmission process and place household electrical appliances in the user's home into a going out mode (turn off the power supplies of the appliances) while an audio streaming service is being provided as a result of the first speech transmission process. In such a case, when the priority level of the audio streaming service is lower than the priority level of the household electrical appliance control service, the user can cancel the audio streaming service and receiving provision of the household electrical appliance control service by uttering the second activation word. In other words, the user can cancel the playback of music to turn off the power supplies of the appliances, and go out.

It is to be noted that the kind of a service that is currently being provided can be recognized by means of, for example, communication unit 14b receiving information indicating the service details that are transmitted from third party cloud server group 130, or the like that is the service provider. Such information is unnecessary in the case of a VPA cloud server which provides only one kind of service.

Embodiment 5

Figure 14:
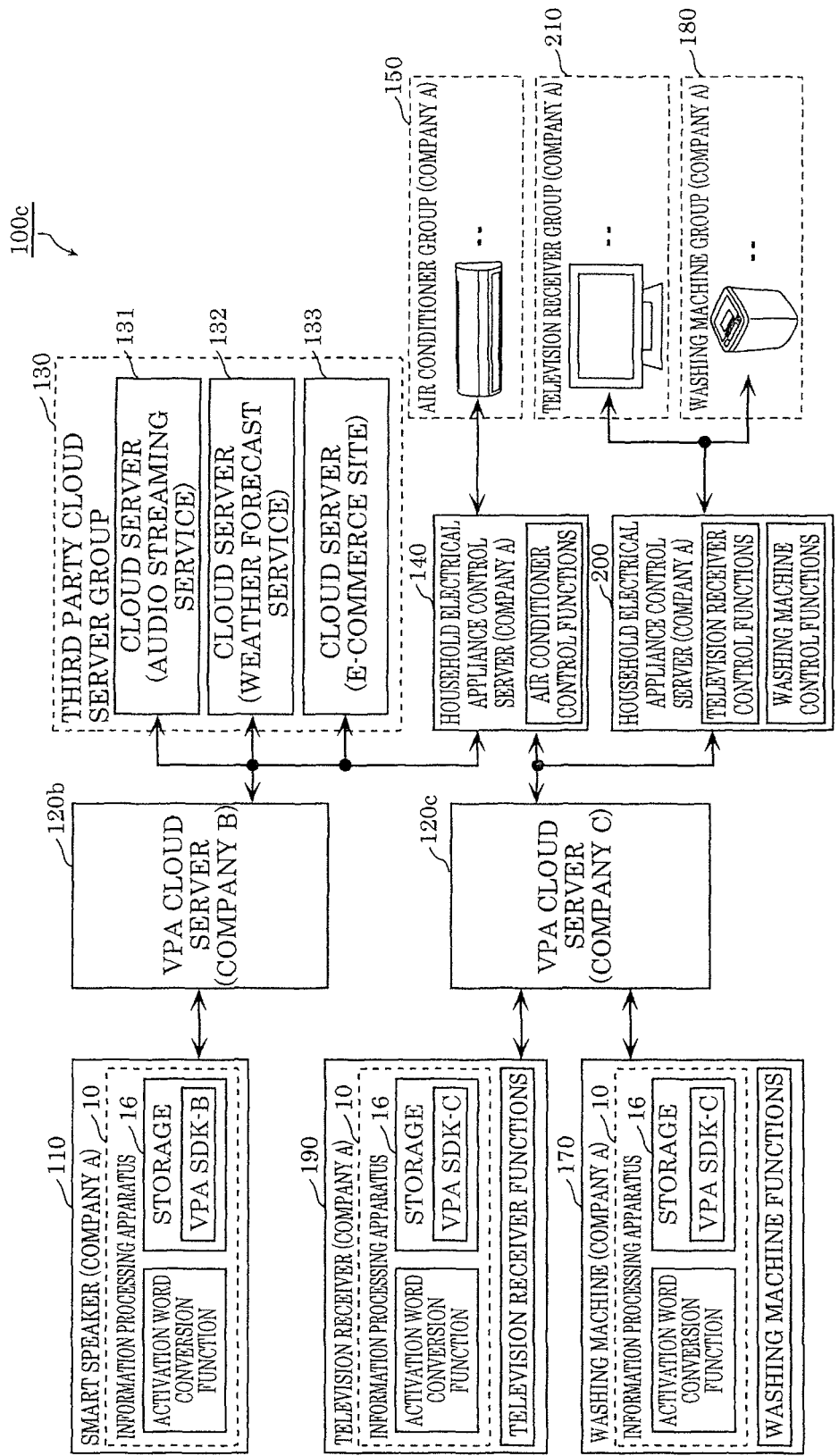
FIG. 14 is a simple block diagram indicating a configuration of a speech recognition system according to Embodiment 5.

According to information processing apparatus 10 having the activation word conversion function as described in Embodiments 1 to 3, it is possible to use the same activation word(s) in speech recognition system 100c in which a plurality of VPA devices co-exist as illustrated in FIG. 14. FIG. 14 is a simple block diagram indicating a configuration of speech recognition system 100c according to Embodiment 5.

Speech recognition system 100c includes smart speaker 110, television receiver 190, washing machine 170, VPA cloud server 120b, VPA cloud server 120c, third party cloud server group 130, household electrical appliance control server 140, air conditioner group 150, household electrical appliance control server 200, television receiver group 210, and washing machine group 180. Smart speaker 110, television receiver 190, and washing machine 170 are household electrical appliances manufactured and sold by company A, and are installed in a user's home.

Smart speaker 110 includes information processing apparatus 10 having an activation word conversion function. Storage 16 of information processing apparatus 10 stores a VPA SDK-B that is supplied from company B that is a VPA service provider which provides a speech recognition service using VPA cloud server 120b. In other words, smart speaker 110 can be connected to VPA cloud server 120b.

Television receiver 190 includes information processing apparatus 10 having a television function and an activation word conversion function. Storage 16 of information processing apparatus 10 stores a VPA SDK-C that is supplied from company C that is a VPA service provider which provides a speech recognition service using VPA cloud server 120c. In short, television receiver 190 can be connected to VPA cloud server 120c.

Washing machine 170 includes information processing apparatus 10 having a washing function and an activation word conversion function. Storage 16 of information processing apparatus 10 stores a VPA SDK-C that is supplied from company C that is a VPA service provider which provides a speech recognition service using VPA cloud server 120c. In short, washing machine 170 can be connected to VPA cloud server 120c.

VPA cloud server 120b is managed by company B, and can be connected to third party cloud server group 130 and household electrical appliance control server 140. Household electrical appliance control server 140 has a function for controlling air conditioner group 150 and is managed by company A.

VPA cloud server 120c is managed by company C, and can be connected to household electrical appliance control server 140 and household electrical appliance control server 200. Household electrical appliance control server 200 has a function for controlling television receiver group 210 and a function for controlling washing machine group 180, and is managed by company A.

Provided that no activation word conversion functions are mounted on smart speaker 110, television receiver 190, and washing machine 170 in speech recognition system 100c, the user needs to utter an activation keyword specified by company B when turning on the VPA function of smart speaker 110, and to utter an activation word specified by company C when turning on the VPA functions of television receiver 190 and washing machine 170.

On the contrary, when activation word conversion functions are mounted on smart speaker 110, television receiver 190, and washing machine 170, the user can use the same activation word for smart speaker 110, television receiver 190, and washing machine 170. The same activation word may be the activation word specified by company B, the activation word specified by company C, or an activation word other than those specified ones.

Embodiment 6

Figure 15:
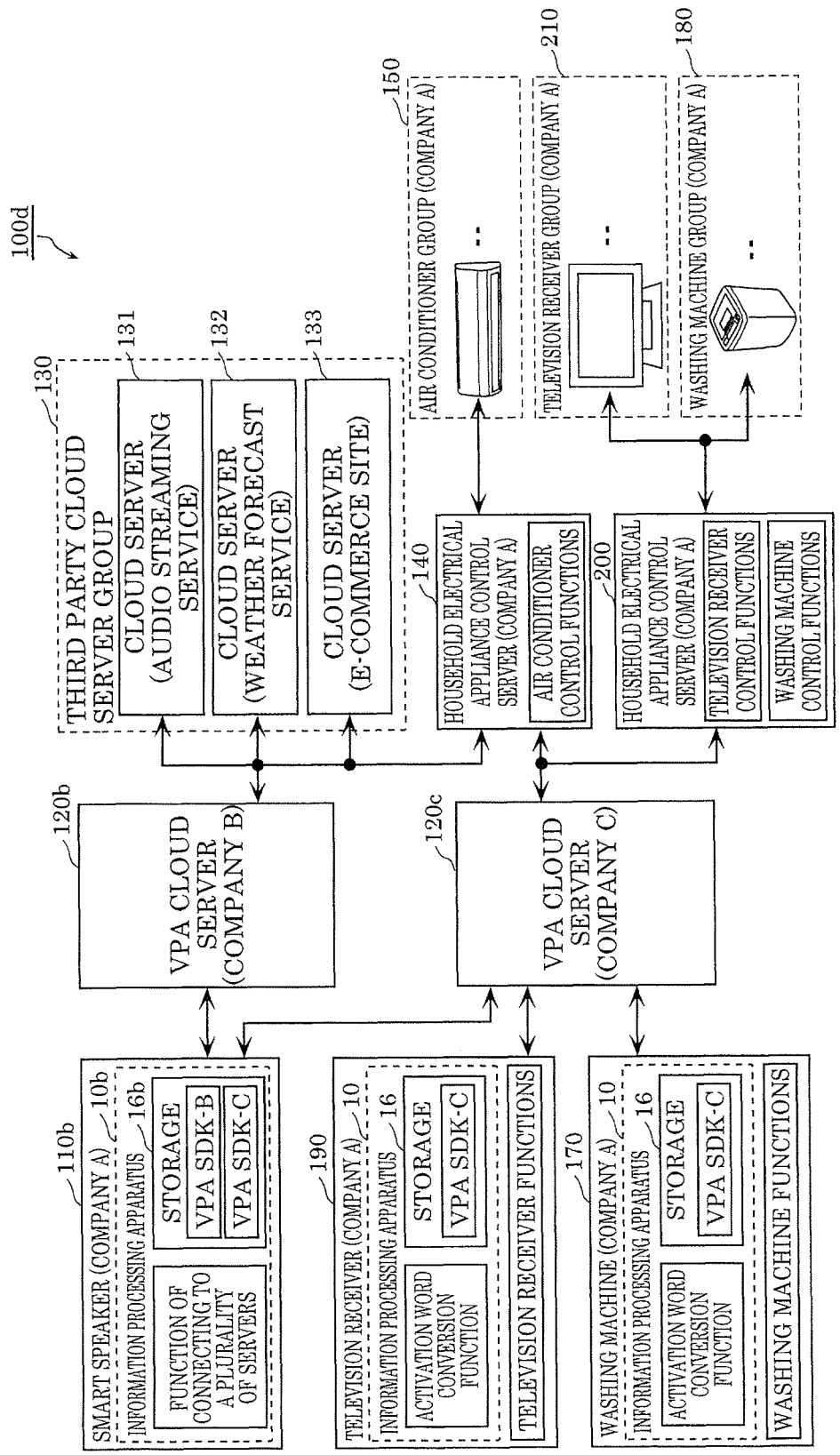
FIG. 15 is a simple block diagram indicating a configuration of a speech recognition system according to Embodiment 6.

According to information processing apparatus 10b having the function for connecting to the plurality of VPA cloud servers described in Embodiment 4, it is possible to organize activation words in speech recognition system 100d in which a plurality of VPA devices co-exist as illustrated in FIG. 15. FIG. 15 is a simple block diagram indicating a configuration of speech recognition system 100d according to Embodiment 6.

Speech recognition system 100d has a configuration obtainable by replacing smart speaker 110 with smart speaker 110b in speech recognition system 100c.

Smart speaker 110b includes information processing apparatus 10b having a function for connecting to a plurality of VPA cloud severs. Storage 16b of information processing apparatus 10b stores a VPA SDK-B and a VPA SDK-C. In short, smart speaker 110b can be connected to VPA cloud server 120b and VPA cloud server 120c.

Also in speech recognition system 100d, the user can use the same activation word that is either the activation word specified by company B or the activation word specified by company C, as the activation word for smart speaker 110, television receiver 190, and washing machine 170.

Summary of Embodiments 1 to 6

As described above, information processing apparatus 10 includes: speech obtainer 11 which obtains speech of a user; first controller 12 which, when first controller 12 recognizes that the speech obtained by speech obtainer 11 is a first activation word, outputs a speech signal corresponding to a second activation word different from the first activation word; and second controller 13 which performs an activation process for starting transmission of the speech signal of the speech obtained by speech obtainer 11 to VPA cloud server 120 when second controller 13 recognizes that the speech signal output by first controller 12 indicates the second activation word. VPA cloud server 120 is an example of a speech recognition server.

Information processing apparatus 10 is capable of starting transmission of speech to VPA cloud server 120 triggered by the first activation word other than the second activation word specified by the VPA service provider. In addition, information processing apparatus 10 is capable of setting the same activation word in either speech recognition system 100c or speech recognition system 100d in which the plurality of VPA devices co-exist as in Embodiments 5 and 6.

In addition, in Embodiment 1, when first controller 12 recognizes that the speech obtained by speech obtainer 11 is the second activation word, first controller 12 outputs the speech signal corresponding to the second activation word to second controller 13.

Information processing apparatus 10 is capable of starting transmission of speech to VPA cloud server 120 triggered by the first activation word other than the second activation word specified by the VPA service provider.

In addition, in Embodiment 3, when first controller 12 recognizes that the speech obtained by speech obtainer 11 is the second activation word, first controller 12 does not output the speech signal corresponding to the second activation word to second controller 13.

Information processing apparatus 10 is capable of activating speech recognition system 100a triggered only by the first activation word out of the first activation word and the second activation word.

In addition, in Embodiment 2, VPA cloud server 120 transmits a command to another server according to a speech recognition result of the speech signal received from information processing apparatus 10 after the activation process. First controller 12 outputs a speech signal corresponding to the second activation word when first controller 12 recognizes that the speech obtained by speech obtainer 11 is the first activation word, and outputs a speech signal corresponding to a specification word for specifying a transmission destination of the command to second controller 13.

In this way, the user can omit uttering the specification word.

In addition, for example, first controller 12 outputs, to second controller 13, the speech signal corresponding to the first activation word as the speech signal corresponding to the specification word.

In this way, the user can designate the transmission destination of the command by uttering once the first activation word that should be uttered twice normally.

Furthermore, speech recognition system 100 or speech recognition system 100a includes information processing apparatus 10 and VPA cloud server 120.

Either speech recognition system 100 or speech recognition system 100a is capable of starting transmission of speech to VPA cloud server 120 triggered by the first activation word other than the second activation word specified by the VPA service provider.

Furthermore, an information processing method which is executed by a computer includes: obtaining speech of a user; when the speech obtained is recognized to be a first activation word, outputting a speech signal corresponding to a second activation word different from the first activation word; and when the speech signal output is recognized to indicate the second activation word, performing an activation process for starting transmission of the speech signal of the speech obtained to a VPA cloud server.

Information processing method allows to start transmission of speech to VPA cloud server 120 triggered by the first activation word other than the second activation word specified by the VPA service provider.

Furthermore, in Embodiment 4, information processing apparatus 10b includes: speech obtainer 11 which obtains speech of a user; first controller 12b which, when first controller 12b recognizes that the speech obtained by speech obtainer 11 is a first activation word, outputs a speech signal corresponding to the first activation word; and second controller 13b which starts a first speech transmission process of transmitting the speech signal of the speech obtained by speech obtainer 11 when second controller 13b recognizes that the speech signal output by first controller 12b indicates the first activation word. First controller 12b determines whether to output a speech signal corresponding to a second activation word to second controller 13b based on a predetermined priority level when first controller 12b recognizes in the first speech transmission process that the speech obtained by speech obtainer 11 is the second activation word for causing second controller 13b to start a second speech transmission process, and the second speech transmission process is a process for transmitting the speech signal of the speech obtained by speech obtainer 11 to VPA cloud server 120c different from VPA cloud server 120b. VPA cloud server 120b is an example of a first speech recognition server, and VPA cloud server 120c is an example of a second speech recognition server.

Information processing apparatus 10b is capable of recognizing both the first activation word and the second activation word, and transmitting speech selectively to VPA cloud server 120b and VPA cloud server 120c. More specifically, information processing apparatus 10b is capable of switching from the first speech transmission process to the second speech transmission process with consideration of predetermined priority levels.

In addition, for example, first controller 12b determines to output the speech signal corresponding to the second activation word to second controller 13b when a priority level of VPA cloud server 120b is lower than a priority level of VPA cloud server 120c.

Information processing apparatus 10b is capable of switching the first speech transmission process to the second speech transmission process, based on the priority levels of the VPA cloud servers.

In addition, for example, first controller 12b determines not to output the speech signal corresponding to the second activation word to second controller 13b when the priority level of VPA cloud server 120b is higher than the priority level of VPA cloud server 120c.

Information processing apparatus 10b is capable of continuing the first speech transmission process, based on the priority levels of the VPA cloud servers.

In addition, for example, first controller 12b determines to output the speech signal corresponding to the second activation word to second controller 13b when a priority level of a first service that is provided as a result of the first speech transmission process is lower than a priority level of a second service that is provided as a result of the second speech transmission process.

Information processing apparatus 10b is capable of switching the first speech transmission process to the second speech transmission process, based on the priority levels of the services.

In addition, for example, first controller 12b determines not to output the speech signal corresponding to the second activation word to second controller 13b when the priority level of the first service is higher than the priority level of the second service.

Information processing apparatus 10b is capable of continuing the first speech transmission process, based on the priority levels of the services.

Furthermore, speech recognition system 100b includes information processing apparatus 10b, VPA cloud server 120b, and VPA cloud server 120c.

Speech recognition system 100b is capable of recognizing both the first activation word and the second activation word, and transmitting speech selectively to VPA cloud server 120b and VPA cloud server 120c. More specifically, speech recognition system 100b is capable of switching from the first speech transmission process to the second speech transmission process with consideration of the predetermined priority levels.

Furthermore, an information processing method which is executed by a computer includes: obtaining speech of a user; when the speech obtained was recognized to be a first activation word, outputting a speech signal corresponding to the first activation word; when the speech signal output was recognized to indicate the first activation word, starting a first speech transmission process of transmitting a speech signal of the speech obtained to VPA cloud server 120b; and when the speech obtained in the first speech transmission process was recognized to indicate the second activation word for starting a second speech transmission process, determining whether to output a speech signal corresponding to the second activation word based on predetermined priority levels, wherein the second speech transmission process is a process of transmitting the speech signal of the speech obtained to VPA cloud server 120c different from VPA cloud server 120b.

Information processing method enables recognition of both the first activation word and the second activation word, and speech transmission selectively to VPA cloud server 120b and VPA cloud server 120c. More specifically, information processing method enables switching from the first speech transmission process to the second speech transmission process with consideration of predetermined priority levels.

Other Embodiments

Although some embodiments have been described, the present disclosure is not limited to the embodiments described above.

For example, these general and specific aspects of the present disclosure may be implemented using an apparatus, a system, a method, an integrated circuit, a computer program, or a computer-readable recording medium such as a CD-ROM, or any combination of apparatuses, systems, methods, integrated circuits, computer programs, or computer-readable recording media. The present disclosure may be implemented as a program for causing a computer to execute the information processing method according to any of the embodiments described above, or may be implemented as a non-transitory computer readable recording medium in which the program is stored.

Alternatively in any of the embodiments, a process that is executed by a particular processing unit may be executed by another processing unit. In addition, the order of the plurality of processes in the operations of the speech recognition system described in each of the embodiments is an example. The order of the plurality of processes may be modified, or some of the plurality of processes may be executed in parallel.

In any of the embodiments, each of the constituent elements such as the first controller and the second controller may be implemented by means of a software program suitable for the constituent element being executed. Each constituent element may be implemented by means of a program executor such as a CPU and a processor reading and executing the software program recorded on a recording medium such as a hard disc or a semiconductor memory. The first controller and the second controller may be implemented as a single CPU or a processor.

In addition, the constituent elements such as the first controller and the second controller may be implemented as hardware. Specifically, the constituent elements such as the first controller and the second controller may be implemented as one or more circuits or one or more integrated circuits. These circuits may be configured as a single circuit as a whole or as separate circuits. In addition, each of these circuits may be a general-purpose circuit or an exclusive circuit.

In addition to the above, the present disclosure encompasses embodiments which are obtainable by adding various kinds of modifications that a person skilled in the art would arrive at to any of the embodiments and embodiments which are implemented by arbitrarily combining the constituent elements and functions in the embodiments without departing from the scope of the present disclosure.

INDUSTRIAL APPLICABILITY

The information processing apparatus according to the present disclosure is capable of transmitting speech signals selectively to a plurality of VPA cloud servers. The information processing apparatus according to the present disclosure is capable of contributing to spreading of VPA devices and spreading of services using VPA cloud servers because of the easiness in switching between the VPA cloud servers which are connection destinations.

The invention claimed is:

1. An information processing apparatus, comprising:
a speech obtainer which obtains speech of a user;
a first controller which, when the first controller recognizes that the speech obtained by the speech obtainer is a first activation word, outputs a speech signal corresponding to the first activation word; and
a second controller which starts a first speech transmission process of transmitting the speech signal of the speech obtained by the speech obtainer to a first speech recognition server when the second controller recognizes that the speech signal output by the first controller indicates the first activation word, wherein, when the first controller recognizes in the first speech transmission process that the speech obtained by the speech obtainer is the second activation word for causing the second controller to start a second speech transmission process, the first controller determines whether to cancel the first speech transmission process currently being performed and output a speech signal corresponding to a second activation word to the second controller based on a predetermined priority level, and
the second speech transmission process is a process for transmitting the speech signal of the speech obtained by the speech obtainer to a second speech recognition server different from the first speech recognition server.

2. The information processing apparatus according to claim 1, wherein the first controller determines to output the speech signal corresponding to the second activation word to the second controller when a priority level of the first speech recognition server is lower than a priority level of a second speech recognition server.

3. The information processing apparatus according to claim 2, wherein the first controller determines not to output the speech signal corresponding to the second activation word to the second controller when the priority level of the first speech recognition server is higher than the priority level of the second speech recognition server.

4. The information processing apparatus according to claim 1, wherein the first controller determines to output the speech signal corresponding to the second activation word to the second controller when a priority level of a first service that is provided as a result of the first speech transmission process is lower than a priority level of a second service that is provided as a result of the second speech transmission process.

5. The information processing apparatus according to claim 4, wherein the first controller determines not to output the speech signal corresponding to the second activation word to the second controller when the priority level of the first service is higher than the priority level of the second service.

6. A speech recognition system, comprising:
the information processing apparatus according to claim 1;
the first speech recognition server; and
the second speech recognition server.

7. An information processing method which is executed by a computer, the information processing method comprising:
obtaining speech of a user;
when the speech obtained is recognized as a first activation word, outputting a speech signal corresponding to the first activation word;
when the speech signal output is recognized as the first activation word, starting a first speech transmission process of transmitting a speech signal of the speech obtained to a first speech recognition server; and
when the speech obtained in the first speech transmission process is the second activation word for starting a second speech transmission process, determining whether to cancel the first speech transmission process currently being performed and output a speech signal corresponding to the second activation word based on predetermined priority levels,
wherein the second speech transmission process is a process of transmitting the speech signal of the speech obtained to a second speech recognition server different from the first speech recognition server.

\* \* \* \* \*